United States Patent Office 3,290,372
Patented Dec. 6, 1966

3,290,372
N-SUBSTITUTED DIMESYLIMIDES
Karoly Szabo, Pleasantville, N.Y., assignor to Stauffer Chemical Company, New York, N.Y., a corporation of Delaware
No Drawing. Filed May 2, 1963, Ser. No. 277,489
3 Claims. (Cl. 260—556)

This invention is concerned with substituted dimesylimides and in particular to N-alkylated dimesylimides wherein the alkyl group has attached thereto a hydroxy function or a halogen atom other than fluorine. The invention also pertains to a method of preparing the aforenamed compounds.

The N-alkylated dimesylimides as contemplated herein can be represented by the following general formula:

$$R—N—(SO_2CH_3)_2$$

wherein R is a lower alkyl group having attached thereto a hydroxy function or a halogen atom other than fluorine. Exemplary structures which are illustrative of the general formula include such individual members as those depicted below:

$Cl(CH_2)_2—N—(SO_2CH_3)_2$
$Br(CH_2)_2—N—(SO_2CH_3)_2$
$HO(CH_2)_2—N—(SO_2CH_3)_2$
$Cl(CH_2)_3—N—(SO_2CH_3)_2$
$I(CH_2)_2—N—(SO_2CH_3)_2$ $$\underset{n-C_3H_7}{Cl—CH—CH_2—N—(SO_2CH_3)_2}$$

The new and novel N-substituted dimesylimides of the invention are obtained by a general synthesis which comprises reacting approximately equal molar proportions of the alkali metal salt of dimesylimide with a dihaloalkane or a monohalo saturated aliphatic alcohol. The course of the reaction can be schematically indicated by means of the following chemical equation:

$$R—\boxed{X+M}—N\begin{matrix}SO_2—CH_3\\SO_2—CH_3\end{matrix} \longrightarrow R—N\begin{matrix}SO_2—CH_3\\SO_2—CH_3\end{matrix} + MX$$

wherein X represents chlorine, bromine or iodine, M designates an alkali metal such as sodium, lithium, potassium, etc. and R has the values as previously assigned. It has been found that excellent results ensue by refluxing sodium dimesylimidate with a slight excess of the requisite halogenated component in the presence of a relatively polar organic solvent. During the course of the reaction, a precipitate of sodium halide is formed and the quantity and speed with which this by-product is produced serves as a visual indicator of the readiness with which the reaction takes place. After removal of the sodium halide, which is conveniently effected by filtration, the N-alkylated dimesylimide is isolated by resorting to the usual techniques familiar to the organic chemist. Normally, the desired product is isolated by crystallization from a suitable organic solvent.

As above pointed out, the condensation is advantageously effected in the presence of a relatively polar solvent and in this connection mention is made of such normally liquid solvents as lower saturated alcohols including the lower partial ethers of polyhydric alcohols such as glycols and glycerine, higher alkyl ethers and ketones and the like. Solvents which have proved to be particularly efficacious as a reaction media are the lower monoalkyl ethers of ethylene glycol.

The N-substituted dimesylimides as contemplated herein are valuable as chemical intermediates for organic synthesis and have been found to be especially useful for the preparation of highly effective and potent insecticides, nematicides, miticides, etc. Because of the chemical reactivity of the halogen and hydroxy function affixed to the N-alkyl substituent, the intermediates readily lend themselves to a wide variety of chemical transformations. For instance, the intermediates can be reacted with numerous organophosphorus components thereby giving rise to new and important organic phosphorus compounds characterized by the presence of a dimesyl moiety. In a typical synthesis, an acid chloride of a partially esterified phosphoric acid or its thio counterpart is condensed with approximately an equal molar proportion of a hydroxy alkyl dimesylimide in the presence of a base thereby forming a new type of organophosphorus ester wherein one of the esterifying moieties contains the dimesylimide function. A somewhat similar reaction ensues if the hydroxy alkyl dimesylimide is replaced by its corresponding halo alkyl derivative and the latter component then condensed with an organophosphorus component having at least one free acid grouping, an OH or SH function, which are disclosed and claimed in co-pending patent application, Serial No. 257,877, now U.S. Patent No. 3,172,902, filed February 12, 1963, assigned to the Stauffer Chemical Company.

The requisite starting materials which are required in synthesizing the new and novel hydroxy and halo alkylated dimesylimides of the invention are known chemical entities which are described and disclosed in the technical literature. Thus, dimesylimide is obtained by reacting 2 parts of methanesulfonyl halide with one part of ammonium chloride in the presence of sodium hydroxide, the reaction being carried out in aqueous media. For a detailed description of this synthesis reference is made to Berichte 73 B (1131-3) 1940 and published in the name of B. Helferich et al. With respect to the halogenated components, these are likewise known materials and are moreover available on the chemical market.

In order to illustrate the invention in greater detail, reference is made to the following examples. It is to be understood, however, that these are inserted solely for the purpose of illustration and are not to be construed as placing any limitations on the invention, many variations of which will occur to those skilled in the art without departing from the spirit or scope of the said invention.

EXAMPLE 1

$$ClCH_2CH_2N\begin{matrix}SO_2CH_3\\SO_2CH_3\end{matrix}$$

N,2-chloroethyldimesylimide 78 g. (0.4 M) of sodium dimesylimidate prepared by adding sodium to dimesylimide in absolute alcohol—85 g. (0.6 M) 1-bromo-2-chloroethane and 200 ml. of ethylene glycol monomethylether were placed in a reactor equipped with reflux condenser, stirrer and thermometer. The contents of the reactor were refluxed for a period of 75 hours, after which time formation of inorganic salt had ceased indicating the reaction was complete. The precipitated salt was removed by filtration and the filtrate allowed to stand several hours during which an additional quantity of salt precipitated out. The second crop of salt was filtered off and the filtrate subjected to distillation in vacuo to remove solvent and volatile components. The residue was dissolved in benzene and the resulting solution filtered to remove a small quantity of sodium bromide. The solvent was stripped from the filtrate leaving a white solid residue. After crystallization from Cellosolve, the purified product melted at 99° C. Analytical data for the purified product was in consonance with the above depicted structure.

EXAMPLE 2

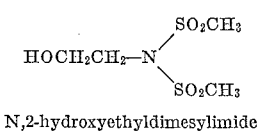

N,2-hydroxyethyldimesylimide 17 g. of sodium dimesylimidate—prepared as explained in Example 1—and 100 ml. of ethylene chlorohydrin were refluxed for 20 hours. At the end of this period, the filtrate of sodium chloride was filtered off and the filtrate subjected to distillation in vacuo to remove volatile components. The pale, viscous yellowish residue which solidified on standing was then filtered by suction to remove traces of an oily impurity and the solid component purified by crystallization from chloroform. The m.p. of the crystallized product was 97° C.

EXAMPLE 3

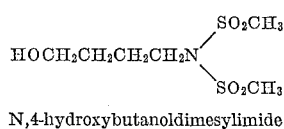

N,4-hydroxybutanoldimesylimide

Using the procedures as described in the previous examples, sodium dimesylimidate was reacted with 4-chloro-1-butanol. After purification by recrystallization from benzene there was obtained a white product melting at 148–150° C.

I claim:
1. A compound of the formula:

$$R-N-(SO_2CH_3)_2$$

wherein R is a lower alkylene chain having from 2 to 4 carbon atoms and having attached thereto a member selected from the class consisting of chlorine, bromine and hydroxy.

2. A compound of the formula:

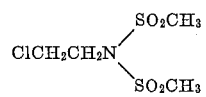

3. A compound of the formula:

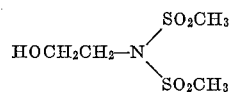

References Cited by the Examiner

UNITED STATES PATENTS

| 2,225,960 | 12/1940 | Orthner et al. | 260—556 X |
| 2,361,322 | 10/1944 | Schroy | 260—556 X |
| 2,652,428 | 9/1953 | Weissberger et al. | 260—556 |

OTHER REFERENCES

Helferich et al., Ber. Deut. Chem., vol. 73, pp. 1131 to 1133, 1940.

JOHN D. RANDOLPH, *Primary Examiner.*

WALTER A. MODANCE, *Examiner.*